United States Patent [19]

McElreath

[11] Patent Number: 4,563,742

[45] Date of Patent: Jan. 7, 1986

[54] COMBINED MOTION CUEING ATTITUDE INDICATOR

[75] Inventor: Kenneth W. McElreath, Cedar Rapids, Iowa

[73] Assignee: Rockwell International Corporation, El Segundo, Calif.

[21] Appl. No.: 535,520

[22] Filed: Sep. 26, 1983

[51] Int. Cl.[4] .................................................. G08G 5/00
[52] U.S. Cl. ..................................... 364/433; 340/975; 244/181
[58] Field of Search ............... 364/433, 434, 424, 443; 340/971, 973, 974, 975, 979; 73/178 R, 178 T, 178 H; 116/DIG. 43; 244/181

[56] References Cited

U.S. PATENT DOCUMENTS

| | | | |
|---|---|---|---|
| 2,782,395 | 2/1957 | Hammond, Jr. | 340/975 |
| 2,807,794 | 9/1957 | Taylor et al. | 340/975 |
| 2,932,024 | 4/1960 | Angelo | 340/974 |
| 3,094,971 | 6/1963 | Guarino et al. | 73/178 |
| 3,516,055 | 6/1970 | Snider | 340/975 |
| 3,744,309 | 7/1973 | Astengo | 244/181 |
| 4,326,189 | 4/1982 | Crane | 340/975 |

FOREIGN PATENT DOCUMENTS

0655138  7/1951  United Kingdom ................ 340/974

Primary Examiner—Parshotam S. Lall
Attorney, Agent, or Firm—Richard W. Anderson; George A. Montanye; H. Fredrick Hamann

[57] ABSTRACT

An attitude indicator provides a display which combines the motion of an aircraft symbol with that of a background/horizon symbol to achieve the best features of conventional "inside-out" and "outside-in" types of attitude displays. The present invention is featured in the provision of a cueing control circuitry which, in response to inputted pitch and bank attitude indicative signals, effects the positioning of at least one of the aircraft symbol and the horizon indicating symbol of an attitude indicator as a function of at least one of the magnitude and rate of change characteristics of pitch and bank attitude signals inputted thereto.

7 Claims, 5 Drawing Figures

COMBINED MOTION CUEING ATTITUDE INDICATOR

This invention relates to displays which pictorially depict the pitch and the bank attitudes of a vehicle.

In the aircraft instrument art, attitude indicators generally employ a horizon depicting symbol and a symbol representing the aircraft, wherein the angular relationship between the two symbols and the translational displacement between the two symbols realistically depicts the pitch and bank attitudes being experienced by the aircraft. As widely employed in the aircraft instrument art, an angular displacement between the aircraft symbol and the horizon indication depicts the bank angle of the aircraft with respect to the horizon. When the aircraft is pitched up from level flight, the horizon indication appears beneath the aircraft symbol, and inversely when the aircraft is positioned in a pitch down attitude, the aircraft symbol is displaced beneath the horizon line. With one or the other these indicators being stabilized in pitch and bank from vertical gyro reference signal inputs, the presentations are intended to provide a realistic presentation to the pilot of the attitude of his craft.

In some conventional attitude indicators, the aircraft symbol remains fixed while the background and horizon indicators move to indicate the aircraft attitude. A few attitude indicators; for example, the Collins FD105 Flight Director Indicator and many rate of turn indicators, employ a moving aircraft symbol to depict pitch or roll attitudes. The conventional moving horizon attitude indicator does portray the actual horizon relationship to the aircraft when compared with the pilot's view outside the aircraft. This presentation is referred to as "inside-out" and often causes the pilot to misinterpret the situation under stress when flying by reference to instruments only. Confusion may be caused by the apparent backward motion of the instrument, especially when it is being scanned along with the other flight instruments and only given fleeting attention.

The presentation provided by an attitude instrument with a moving aircraft symbol overcomes the "reversal" problem, by causing the aircraft symbol to move in the same apparent direction as the aircraft is actually moving. This type of presentation is called "outside-in" and provides the observer with a presentation similar to that which would be observed by a tail chase aircraft. In spite of overcoming the "reversal" problem, the "outside-in" presentation does not accurately portray the aircraft attitude when compared with the view out the wind screen, since it then appears backwards. Also for pitch attitudes particularly, the moving aircraft symbol display is limited in the range of attitudes which may be portrayed.

Accordingly, the object of the present invention is to provide an attitude indicator which provides a display which combines the motion of the aircraft symbol with that of the background/horizon symbol to achieve the best features of both the above-mentioned "inside-out" and "outside-in" types of attitude displays. The present invention is featured in the provision of a cueing control circuitry which, in response to inputted pitch and bank attitude indicative signals, effects the positioning of at least one of the aircraft symbol and the horizon indicating symbol of an attitude indicator as a function of at least one of the magnitude and rate of change characteristics of pitch and bank attitude signals inputted thereto.

The invention is further featured in the maintenance of a constant display gain of the attitude displacement between the aircraft symbol and the background scaling of the attitude display.

These and other features and objects of the present invention will become apparent upon reading the following description with reference to the accompanying drawings, in which:

Figure 1:
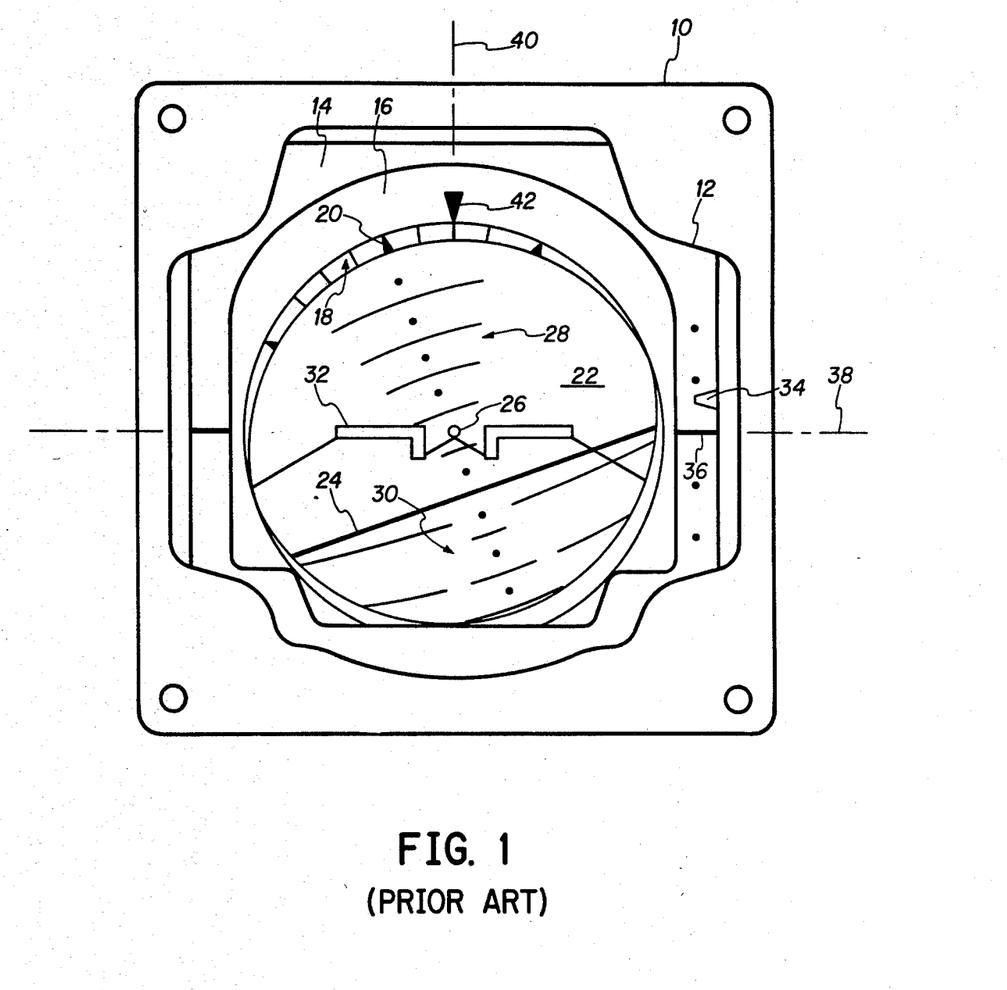
FIG. 1 depicts an observer's view of an attitude indicator of the "inside-out" type of presentation.

FIG. 1 portrays an observer's view of a conventional known attitude indicator which depicts the pitch and bank attitudes being experienced by a vehicle or craft, and which employs an "inside-out" presentation of the attitude situation. With reference to FIG. 1, the instrument is seen to comprise a face plate 10 with an opening 12 through which the attitude situation is depicted. The instrument is fitted with a masking member 14 through which various indicia and symbols are viewable by the observer. In FIG. 1 a mask member 16 carries a fixed bank attitude reference index symbol 42 which lies on a perpendicular bisector of the horizontal axis 38 of the instrument. An aircraft symbol 32 is rigidly affixed so as to lie symmetrically along the horizontal axis 38 of the instrument. Behind the aircraft reference symbol 32 is a background and horizon indicator which is comprised of a horizon indicating line 24 with indices above and below the horizon line depicting the degree of aircraft pitch being experienced. FIG. 1 depicts the attitude display in response to the aircraft being in a 20° right bank with 15° pitch-up attitude. It is noted that the horizon line symbol 24 is rotated by 20° from the horizontal and the 20° bank is readable by the bank scale 18 being likewise rotated such that the bank index pointer 42 reads 20° on the bank scale 18. The horizon indicator line 24 is displaced downwardly from the aircraft symbol 32 such that the central index 26 of the aircraft symbol 32 reads 15° pitch-up on the pitch indicating indices 28.

Figure 2:
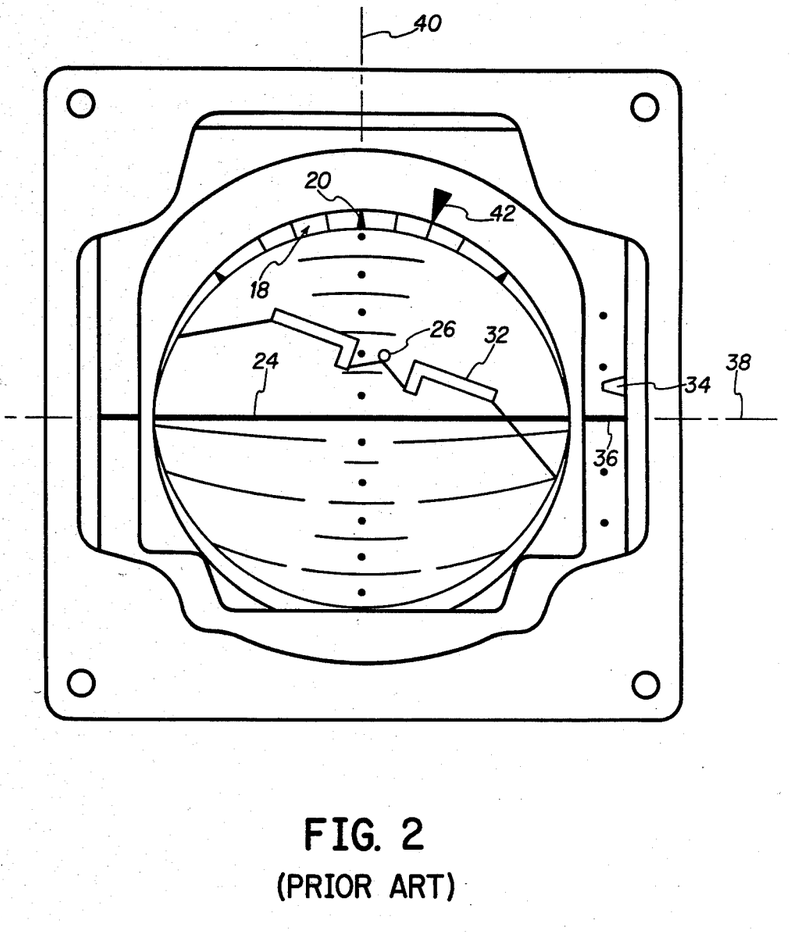
FIG. 2 depicts an observer's view of an attitude indicator of the "outside-in" type of presentation.

Reference is now made to FIG. 2 which depicts a conventional attitude indicator of the type known in the prior art which provides an "outside-in" presentation, wherein the horizon line 24 is fixed in a horizontal position and the attitude is depicted by pitch and/or bank responsive movements of the aircraft symbol 32. Here the same attitude situation of 20° right bank and 15° pitch-up is displayed by the aircraft symbol being translated above the fixed horizon line 24 by 15° to indicate 15° pitch-up, and the aircraft symbol 32 being rotated with respect to the fixed horizon line 24 to indicate 20° right bank attitude. The degree of bank is readable by the relative position of the bank pointer index 42 against the bank scale 18, which, in this situation, is fixed with the index 42 being movable in accordance with the rotation of the aircraft symbol 32. The 20° right bank is again readable by the bank index pointer 42 being positioned to the 20° bank mark on bank scale 18.

Now, considering both the prior art presentations of FIG. 1 and FIG. 2, it is noted that FIG. 1 indicates the attitude by rotation and displacement of the horizon line 24 with respect to the fixed aircraft symbol 32 and the attitude situation is portrayed as the view the pilot would see out the wind screen of the aircraft. This type of presentation is know as the "inside-out" presentation. The same attitude situation as depicted in FIG. 2 fixes the horizon line 24 while displacing and rotating the aircraft symbol to depict the pitch and bank situation. This presentation is that which would be observed by a chase plane flying straight and level observing the aircraft, and this type of presentation is know as the "outside-in" presentation. As previously discussed, each of these situations has certain limitations to the preservation of reality to the pilot observer. In FIG. 1, the pilot feels that the aircraft is banking 20° to the right while the display motion, as he initiates this maneuver, is that of the horizon tilting. In the "outside-in" presentation of FIG. 2, the more desirable aircraft motion is depicted as 20° right bank is attained. However, in the FIG. 2 type of presentation although it overcomes the motion reversal problem as presented to the pilot, the aircraft attitude is not accurately portrayed when compared with the view the pilot sees out the wind screen. Also for pitch attitudes, particularly, the moving aircraft symbol display as depicted in FIG. 2 is limited in the range of attitudes which may be portrayed.

In accordance with the objectives of the present invention, the motion of the aircraft symbol of the attitude indicator is combined with the motion of the background/horizon presentation to achieve the best features of the above-mentioned conventional instruments and to eliminate the shortcomings of each. The combined motion to be further described may be implemented in both the pitch and role axes of the attitude indicator or may be implemented in but one axis, the other axis being implemented conventionally. It is to be understood that conventional attitude indicators are known to rotate an aircraft symbol member in pitch and bank with respect to a fixed horizon indicating indicia, or, alternatively, to display attitude by the rotation and translation of a horizon indicating indicia with respect to a fixed aircraft symbol. Still other known attitude indicators present pitch attitude by up and down translation of an aircraft symbol while displaying bank attitude as the rotation of a horizon line indicia about the central viewing access of the display.

In accordance with the present invention, rather than driving one or the other or both of aircraft symbol indicia and horizon indicating indicia with respect to either pitch or bank attitude as might be provided by a vertical gyro on the craft, one or the other or both of pitch and bank attitude indicating signals is applied to a cueing control circuitry which develops first and second outputs depending upon the magnitude or the rate of change characteristics of the pitch and bank attitude indicative signals is applied to the cueing control circuitry.

In a first embodiment to be herein described, the cueing control circuitry receives pitch and bank indicative input signals and outputs pitch and bank drive signals for the aircraft symbol of the display only for those input attitude signals with magnitude less than a predetermined limit. For pitch or bank attitude signals in excess of the predetermined limit, the cueing circuitry also provides a drive signal to the horizon indicator of the display to the extent that the cueing circuitry input pitch and or bank signals exceed that limit.

In a second embodiment to be herein described, pitch and bank attitude indicative signals are applied to a cueing circuitry which outputs pitch and bank drive signals to the aircraft symbol of the display in response to predetermined high frequency components of the pitch and bank attitude input signals to the cueing circuitry, while outputting pitch and bank drive signals for the horizon indicator symbol in response to predetermined low frequency components of the pitch and bank attitude signals to the cueing circuitry.

In each of the embodiments to be described, either or both of the aircraft symbol indicating of the aircraft symbol or the horizon indicators may be displaced and rotated relative to one another in accordance with a predetermined characteristic of the pitch and bank attitude signals inputted to the system while maintaining integrity between the attitude display indications and the experienced aircraft bank and pitch attitude deviations from straight and level flight.

Figure 3:
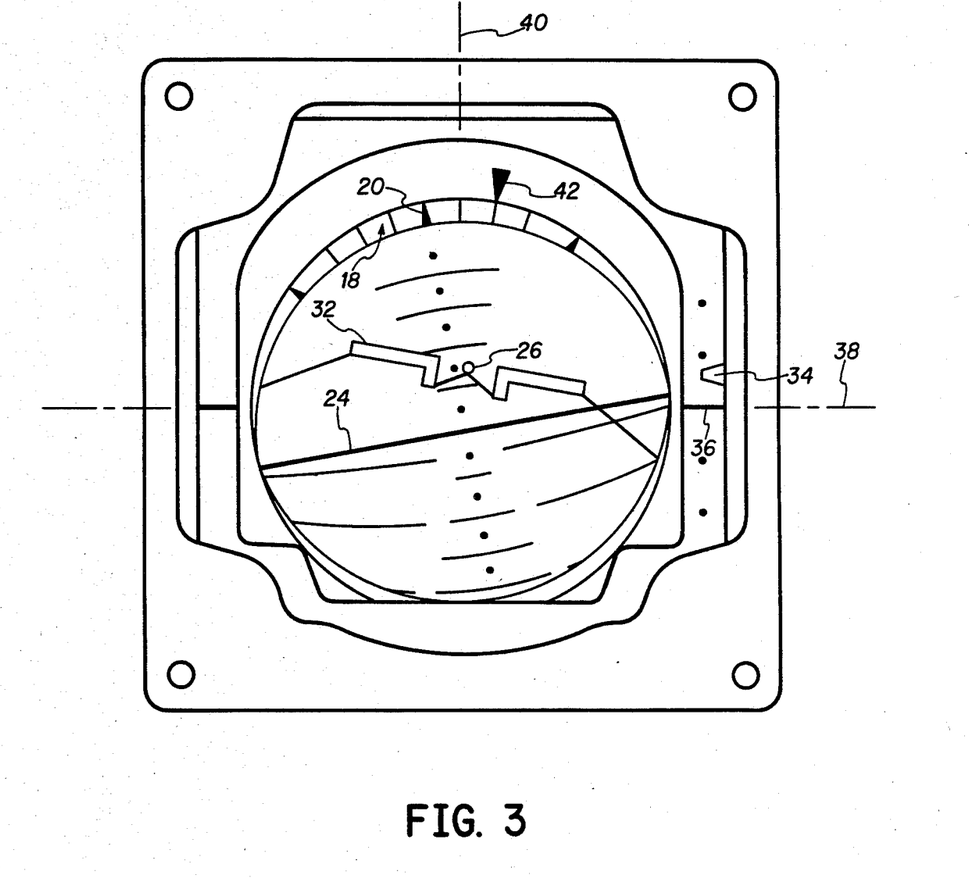
FIG. 3 depicts an observer's view of a combined motion cueing attitude indicator presentation in accordance with the present invention.

With reference to FIG. 3, the 20° right bank and 15° pitch-up attitude presentations previously discussed with reference to FIGS. 1 and 2 is shown. It is to be noted that both the aircraft symbol 32 and horizon indicator 24 are each translated and angularly rotated with respect to the horizontal axis 38 of the display. In addition, it is to be noted that the bank indicating scale 18 is rotated, as well as the bank scale index pointer 42. It is further noted that the central portion 26 of the aircraft symbol 32 is displaced 15° with respect to the horizon indicator 24 to indicate 15° pitch-up while the integrity of the bank angle display is maintained by indicating 20° between the central zero indicating index 20 of the bank scale 18 and the bank pointer index 42. FIG. 3 represents the display in accordance with a first cueing embodiment wherein the relative angular displacement and translation between the aircraft symbol 32 and the horizon indicator 24 are in accordance with the particular magnitude of the pitch and bank signals inputted to the drive circuitry and the extent to which this magnitude exceeds a predetermined limit which is built into the cueing system.

As will be apparent from ensuing discussion, a further advantage of the attitude indicator of the present invention is that the moving aircraft symbol moves in the pitch axis in the same direction as the glidescope indication in an ILS approach. With reference to FIG. 3, the corresponding motions of the aircraft symbol 32 and the glide slope indicator 34 with respect to reference line 36, when introducing pitch attitude changes to attain the glidescope, help the pilot to judge the size and effect of any pitch attitude changes with respect to following the glideslope. Thus, the pilot may easily make small pitch attitude adjustment to correct glideslope deviations.

Figure 4:
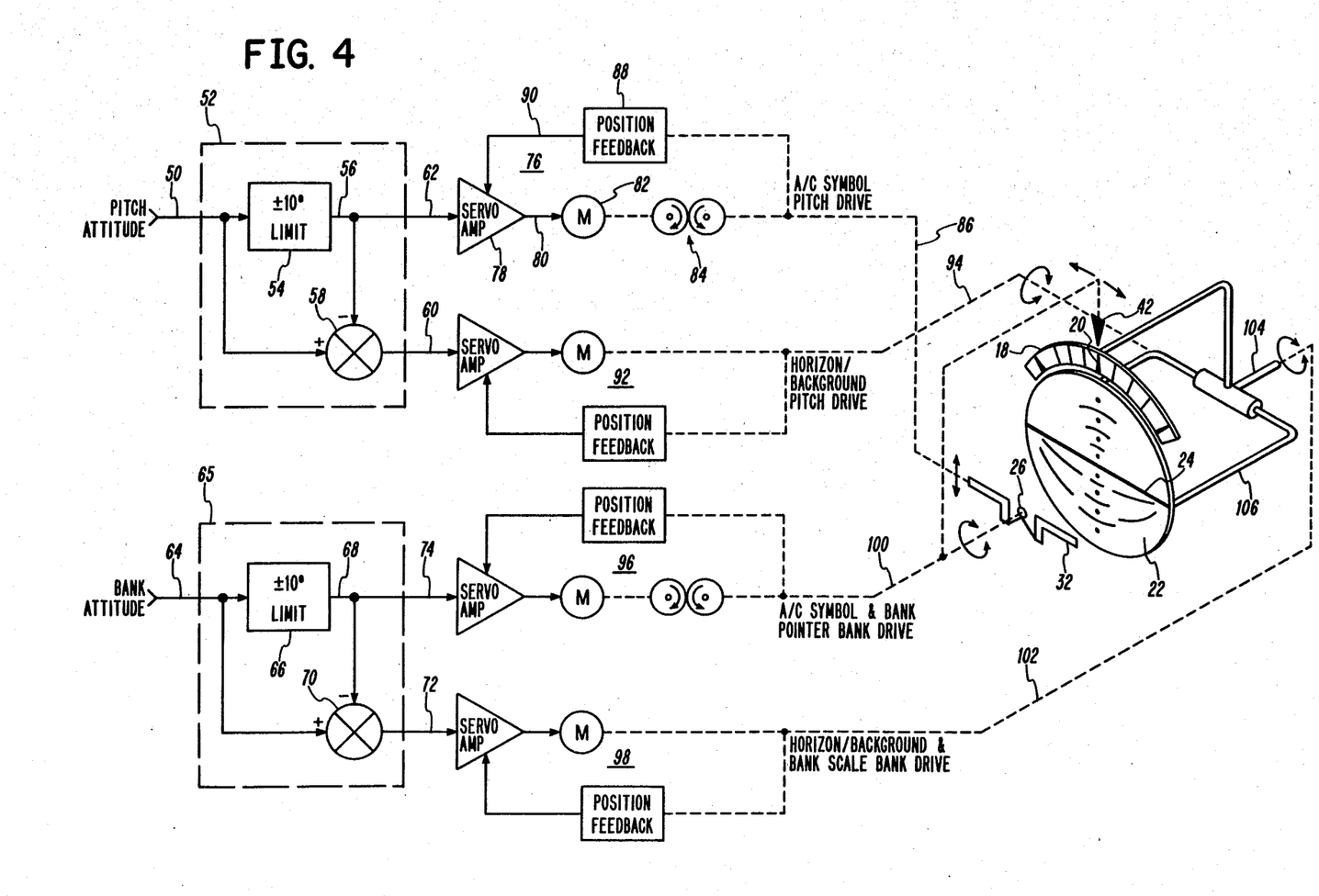
FIG. 4 is a functional representation of an attitude indicator employing a first embodiment of motion cueing in accordance with the present invention.

The embodiment of the present invention employing attitude limit definitive cueing in accordance with the invention is depicted functionally in FIG. 4. In contradistinction with prior art attitude displays, a pitch attitude indicative input signal 50 and a bank attitude indicative signal 64 (as might be obtained from a vertical gyro on board the vehicle carrying the instrument) are applied to an associated cueing control circuitry by means of which a pair of output drive signals are developed depending upon the amplitudes of the respective pitch and bank attitude input signals 50 and 64. Pitch attitude input signal 50 is applied to a cueing control circuitry 52 which provides a first output 62 utilized to position the aircraft symbol in pitch and a second output 60 which is utilized to drive the horizon/background indication of the display in pitch. Similarly, the bank attitude indicative input signal 64 is applied to a cueing control 65 which provides a first drive output 74 to position the aircraft symbol and the bank pointer reference symbol in bank, while providing a second output 72 as a drive signal to position the horizon/background indicator and the bank scale of the display in accordance with bank. As will be further evident, the display of the present invention, in driving one or both of the aircraft symbol and horizon indicating members of the display, must additionally, in order to maintain the integrity of the bank indication, drive the bank index pointer in concert with the bank drive of the aircraft symbol and drive the bank indicating scale in concert with the bank drive to the horizon indicator.

As depicted in FIG. 4, each of the cueing control circuitries 52 and 64 is comprised of a limiter and a signal summer, with the output of the limiter comprising aircraft symbol drive signal, and the output of the summer driving the horizon indicator. As an example, the pitch attitude input signal 50 to cueing control circuitry 52 is applied through a +/−10° limiter circuitry 54 to provide an aircraft symbol pitch drive output signal 56 which is applied on line 62. The output 56 of the limiter is additionally applied as a first input to signal summer 58 while the pitch attitude input signal is applied as the second input to summer 58. Summer 58 subtractively combines the output from limiter 54 with the input pitch attitude signal 50 to provide an output drive signal 60 utilized in driving the horizon indicator. It is to be noted that any pitch attitude input signal 50 corresponding to pitch attitudes up to +/−10° is imparted as an aircraft symbol pitch drive symbol 62, while the output of the signal summer 58, wherein the output from limiter 54 is subtractively combined with the pitch attitude input signal 50, is zero. Thus, for pitch attitudes less than 10°, only the aircraft symbol of the display is driven in pitch while the horizon background is held stationary in pitch.

For a pitch attitude input signal on line 50 in excess of the limit imposed by limiter 54, the output 56 from the limiter remains at the 10° limit, while the output from summer 58 corresponds to the extent to which the pitch attitude input signal 50 exceeds the 10° limit. In the case of the 15° pitch-up displayed in FIG. 3, it is noted that the aircraft symbol 32 is displaced in pitch 10° above the horizontal axis 38 of the display, while simultaneously the horizon indicator 24 is displaced downwardly by 5° with respect to the horizontal axis 38 of the instrument display. The integrity of the actual pitch attitude being experienced and that which is displayed is thus maintained, since 15° is readable off the display as concerns relative pitch between the horizon indicator 24 and the aircraft symbol 32.

Now, with reference to the bank drive channel of the embodiment of FIG. 4, bank attitude indicative input signal 64 is applied to cueing control circuitry 65 which, in the example shown, is indicated as identical to that of the cueing control circuitry 52 employed in the pitch drive channel. Bank attitude signal 64 is applied to a +/−10° limiter 66 the output 68 of which is applied as a first input to a signal summer 70, with the bank attitude input signal 64 applied as a second input to the signal summer 70. The output 68 from the limiter 66 comprises a bank drive signal 74 for the aircraft symbol and bank pointer indicia of the display, while the output 72 from the signal mixer 70 comprises a bank drive signal for the horizon/background indicator of the display along with the bank scale of the display. As in the pitch channel previously described, any bank attitude input signal 64 corresponding to less than 10° of bank left or right develops a bank drive signal 74 output in accordance therewith while holding the output 72 from the bank cueing circuitry to zero. For bank attitudes in excess of +/−10° the output from the signal summer 70 corresponds to the extent to which the bank attitude exceeds the limit imposed by limiter 66. Thus in the the aforedescribed example with reference to FIG. 3, where a 20° right bank is displayed, it is noted that the display effects a rotation of both the horizon indicator 24 and the aircraft symbol 32 such that the relative angle therebetween is the 20° bank being experienced, while the integrity of the bank indication displayed by the instrument is maintained since 10° of rotation is imparted to both the bank scale indicator and the bank index pointer indicator, and the experienced bank angle of 20° is readable by the displacement between bank pointer 42 from the center index 20 of the bank scale.

The drive signals, thus described as being developed by the respective cueing circuitries 52 and 65, are shown in FIG. 4 as being applied to electromechanical arrangements to drive an electromechanical attitude display. It is to be emphasized that the present invention is not limited to electromechanical displays and may be employed with current electronic cathode ray tube display technology wherein the symbology which comprises the attitude display is developed by electronic symbol generators and the rotation and translation of the electronically generated symbols is effected by inputting pitch and bank attitude indicative signals to a microprocessor associated with the electronic symbol generator.

Proceeding with the description of the electromechanical display depicted functionally in FIG. 4, the aircraft pitch drive output signal 62 is applied to a servo amplifier 78 which provides an output 80 to drive a servo motor 82 through reversing gear train 84 to develop a shaft drive output functionally depicted as 86. Output drive shaft 86 is shown as conventionally driving a position feedback transducer 88 which develops an output signal 90 which is fed back to the servo amplifier 78. When the position feedback on line 90 equates to the input drive signal 62 the output 80 of the servo amplifier 78 is zero and the output drive shaft 86 is thus positioned in accordance with the input drive signal 62.

In similar fashion, the output drive signal 60 from cueing control circuitry 52 is inputted through a similar servo amplifier to drive a motor to position a drive a shaft 94 in accordance with the input drive signal 60. It may be noted that since the sensing of the drive signals 62 and 60 is similar, the servo positioning arrangement 92 which responds to drive signal 60 is not shown as employing a drive reversing gear arrangement 84 so as to functionally depict, in response to pitch attitude input signals 50 to cueing control circuitry 52, that output drive shafts 86 and 94 are positioned in mutually opposite directions. This of course, in an electromechanical arrangement, might be otherwise implemented as by employing appropriate motion reversing mechanisms in the electromechanical display. For the purpose of the present invention, the aircraft symbol pitch drive effected by drive 86 and the horizon background pitch drive effected by output drive 94 are in mutually opposite direction, that is, a pitch-up signal will result in an output drive 86 to move the aircraft symbol above the center line of the display while a pitch-up signal which is imparted to output drive 94 will effect a positioning of the horizon indicator 24 below the horizontal axis of the instrument presentation.

The aircraft symbol pitch drive on output drive 86 is functionally depicted as effecting a translation of the aircraft symbol 32 of the display above and below the horizontal viewing axis, while the output drive 94 is imparted to translate the horizon line 24 of the display above and below the horizontal viewing axis of the display. In FIG. 4, the horizon line 24 and background display is functionally depicted as being placed on the surface of a concave disk member 22 and the horizon and background pitch drive 94 is functionally depicted as rotating a yoke 106 so as to translate the disk member 82 with respect to the horizontal axis of the instrument in accordance with pitch attitude.

The bank drive output signals 74 and 72 from the bank cueing control circuitry 65 are likewise applied to functionally depicted servo drive mechanisms 96 and 98, with servo positioning network 96 providing an output drive 100 which effects rotation of both the aircraft symbol 32 and the bank indicating scale 18 in response to bank attitude up to the limit imposed by limiter 66. The output 72 from the bank attitude cueing circuitry 65 is applied to a further servo positioning network 98 to develop an output drive 102 which is utilized to rotate in concert both the disk member 32 upon which the horizon line 24 is placed and the bank indicating scale 18. This simultaneous drive action is functionally depicted by an arm member affixed to the member in which the yoke 106 is rotatably driven in accordance with bank drive. As functionally depicted in FIG. 4, the aircraft symbol 32 is rotated in concert with the bank index pointer member 42 while the bank indicating scale 18 is rotated in concert with the horizon indicator 24. The embodiment of FIG. 4 thus displays pitch and bank attitudes by driving the aircraft symbol member in an outside-in convention for pitch and bank attitudes less than a predetermined limit. It might be noted that although 10° has been exampled as a limit for each of the pitch and bank attitude cueing circuitries of FIG. 4, these limits obviously might be modified and obviously need not be the same limit. It is further to be emphasized that although each of the pitch and bank drive channels in the embodiment of FIG. 4 includes an amplitude limit cueing circuitry, either the pitch or the bank channel might include an amplitude controlled cueing circuitry as above described with the other channel being driven conventionally.

Figure 5:
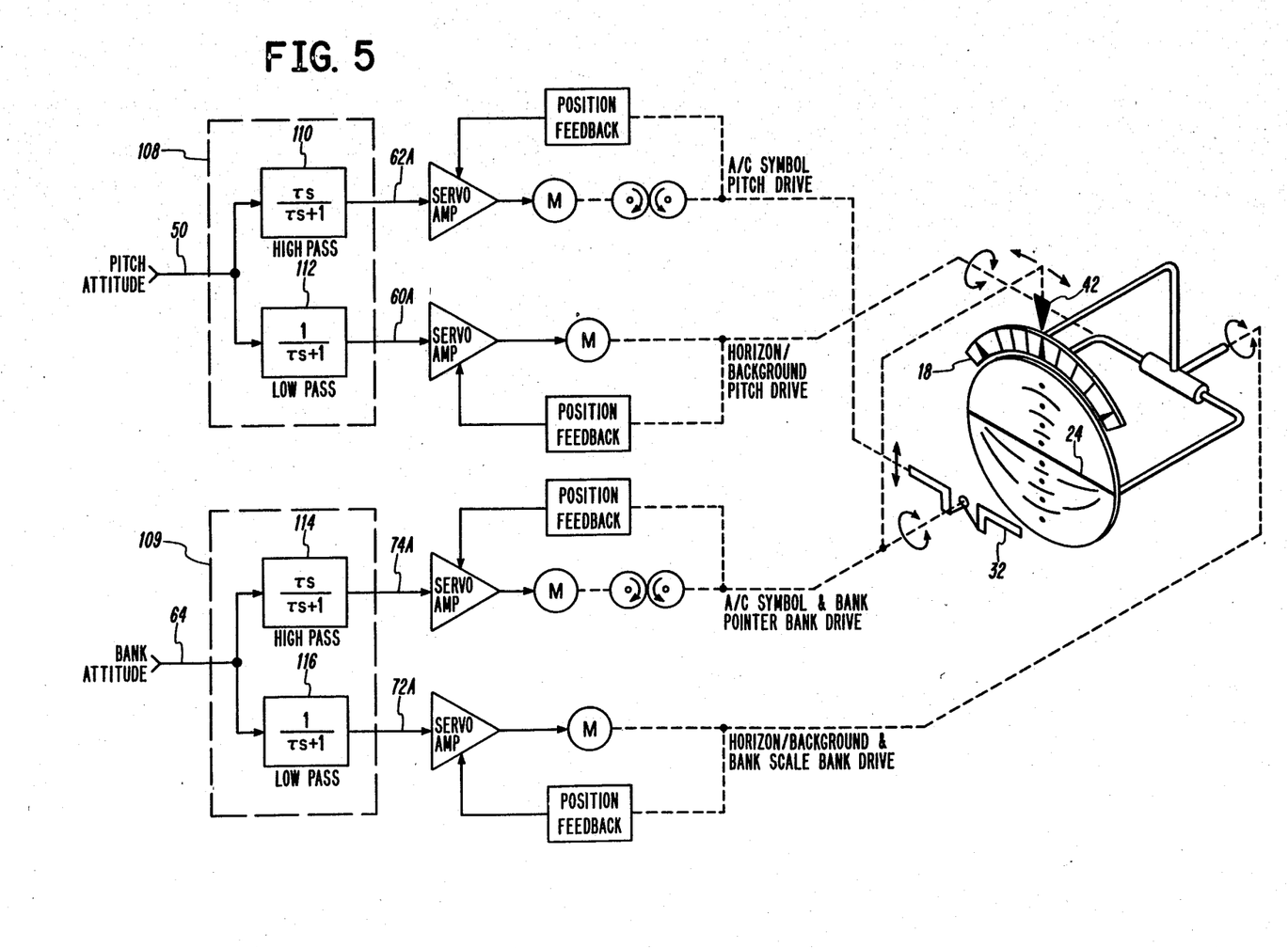
FIG. 5 is a functional diagram of an attitude indicator in accordance with the present invention employing a further motion cueing embodiment.

A further embodiment of cueing circuitries in accordance with the concept of the present invention is depicted in FIG. 5. Here, cueing circuitries 108 and 109 are employed to develop pitch attitude output drive signals 62A and 60A and bank output drive signals 74A and 72A, respectively. In the embodiment of FIG. 5, the pitch attitude and bank attitude indicative input signals 50 and 64 are cued on the basis of their dynamic characteristics.

Pitch attitude indicative input signal 50 is applied as input to a high-pass filter 110 and a low-pass filter 112. Drive output signal 62A of FIG. 5 is utilized in positioning the aircraft symbol 32 in pitch while cueing circuitry drive output 60A is utilized in driving the horizon indicator 24 of the display in pitch. Similarly, the bank attitude indicative input signal 64 is applied as input to a high-pass filter 114 and to a low-pass filter 116, with output 74A from the high-pass filter 114 being utilized to drive the bank pointer symbol 42 and the aircraft symbol 32 in bank, while the output 72A from low-pass filter 116 is utilized to drive the horizon indicator 24 and bank scale indicator 18 in accordance with bank attitude.

In the embodiment of FIG. 5 instead of separating the aircraft motion representation by amplitude as described with reference to the embodiment of FIG. 4, the motions of the aircraft symbol and the horizon background are related by the frequency or rate of actual aircraft motion. For example, high frequency attitude changes are portrayed by the aircraft symbol motion while low frequency motions are portrayed by the background/horizon motion. Thus, if the pilot suddenly pitched the aircraft upward, the aircraft symbol 32 would move to show the pitch change and give the pilot a correct apparent "response" to his input. After this initial indication, the aircraft symbol 32 would slowly drift back to its neutral position and the horizon indicator 24 would also slowly move downwardly so that the true pitch attitude relationship between these display elements would be preserved. The primary advantage of the embodiment of FIG. 5 resides in the situation that the aircraft symbol 32 would always respond to attitude rates and the horizon indicator 24 would always show the long-term attitude accurately.

The mechanizations of the embodiments of FIGS. 4 and 5 have been described herein in terms of conventional mechanical means using electromechanical servo mechanisms. It is to be emphasized again that the attitude display in accordance with the present invention may be incorporated in an electronic cathode ray tube flight instrument, utilizing appropriate computer software to both create the symbols and govern their motion in accordance with the cued pitch and bank drive signals described herein.

Thus, although the present invention has been described with respect to particular embodiments thereof, it is not to be so limited, as changes might be made therein which fall with the scope of the invention as defined by the appended claims.

I claim:
1. In an attitude indicator instrument for an aircraft,
   an aircraft symbol positionable in accordance with pitch and bank attitudes of said aircraft,
   a horizon indicator positionable in accordance with pitch and bank attitudes of said aircraft;
   cueing control circuitry receiving inputs proportional to the experienced pitch and bank attitudes of said aircraft, said cueing control circuitry selectively effecting the positioning of both said aircraft symbol and said horizon indicator as a function of at least one of the magnitude and rate of change characteristics of at least one of the pitch and bank attitude signals applied to said cueing control circuitry.
2. The attitude indicator as defined in claim 1 wherein said cueing control circuitry receives said pitch and bank indicative input signals and comprises means for outputting pitch and bank positioning signals for said aircraft symbol only for cueing circuitry input signals with magnitude less than that definitive of a predetermined limit of the degree of aircraft attitude departure from horizontal and for cueing circuitry input signals definitive of aircraft attitude in excess of predetermined limit to output a positioning signal to said horizon indicator proportional to the extent that said cueing circuitry input signals exceed said limit.

3. The attitude indicator as defined in claim 2 wherein said cueing circuitry comprises first and second signal translating means, said first signal translating means comprising a signal amplitude limiter to which a pitch attitude input signal is applied, the output of said limiter comprising a pitch positioning signal for said aircraft symbol, and a signal summer in which the output of said limiter and said pitch attitude input signal are subtractively combined to provide a pitch positioning output signal for said instrument horizon indicator, said second signal translating means comprising a signal amplitude limiter to which a bank attitude input signal is applied, the output of said limiter comprising a bank positioning signal for said aircraft symbol, and a signal summer in which the output of said limiter and said bank attitude input signal are subtractively combined to provide a bank positioning output signal for said instrument horizon indicator.

4. The attitude indicator as defined in claim 3 further comprising:

a bank indicating scale including a zero index indicia lying on the perpendicular bisector of said horizon indicator, means for rotating said bank indicating scale in accordance with the rotation of said horizon indicator in response to bank positioning signal imparted to said horizon indicator, a bank reference indicator juxtaposed with said bank indicating scale, and means for rotating said bank reference indicator in accordance with the rotation of said aircraft symbol in response to bank positioning signal imparted to said aircraft symbol, with said scale and reference indicator rotations being in mutually opposed direction.

5. The attitude indicator as defined in claim 1 wherein said cueing circuitry comprises a signal translating means receiving said aircraft pitch and bank attitude signals as respective inputs thereto, said signal translating means outputting pitch and bank positioning signals for said aircraft symbol in response to predetermined high frequency components of the pitch and bank attitude input signals, and outputting pitch and bank positioning signals for said horizon indicator symbol in response to predetermined low frequency components of the pitch and bank attitude input signals.

6. The attitude indicator as defined in claim 5 when said signal translating means comprises a first high-pass filtering means and a first low-pass filtering means to which an input pitch attitude signal is inputted, the output of said first high-pass filtering means comprising said pitch positioning signal for said aircraft symbol and the output of said first low-pass filtering means comprising said pitch positioning signal for said horizon indicator;

a second high-pass filtering means and a second low-pass filtering means to which said bank attitude signal is inputted, the output of said second high-pass filtering means comprising said bank attitude positioning signal for said aircraft symbol and the output of said second low-pass filtering means comprising said bank attitude positioning signal for said horizon indicator.

7. The attitude indicator as defined in claim 6 further comprising:

a bank indicating scale including a zero index indicia lying on the perpendicular bisector of said horizon indicator, means for rotating said bank indicating scale in accordance with the rotation of said horizon indicator in response to bank positioning signal imparted to said horizontal horizon indicator, a bank reference indicator juxtaposed with said bank indicating scale, and means for rotating said bank reference indicator in accordance with the rotation of said aircraft symbol in response to bank positioning signal imparted to said aircraft symbol, with said scale and reference indicator rotations being in mutually opposed direction.

* * * * *